(12) United States Patent
Subramani et al.

(10) Patent No.: US 9,111,110 B2
(45) Date of Patent: Aug. 18, 2015

(54) RETROACTIVE SHARED CONTENT ITEM LINKS

(71) Applicant: Dropbox, Inc., San Francisco, CA (US)

(72) Inventors: Anand Subramani, San Francisco, CA (US); Mark Delamere, Sausalito, CA (US); Jonathan Vincent, San Francisco, CA (US); Philip Rha, San Francisco, CA (US); Emil Ibrishimov, Redwood City, CA (US); Thomas Carriero, San Francisco, CA (US); Francois Alexander Allain, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 58 days.

(21) Appl. No.: 13/888,584

(22) Filed: May 7, 2013

(65) Prior Publication Data
US 2014/0230009 A1    Aug. 14, 2014

Related U.S. Application Data

(60) Provisional application No. 61/762,894, filed on Feb. 9, 2013.

(51) Int. Cl.
| | |
|---|---|
| G06F 17/00 | (2006.01) |
| H04L 29/06 | (2006.01) |
| G06F 7/04 | (2006.01) |
| G06F 17/30 | (2006.01) |
| G06F 15/16 | (2006.01) |
| H04N 7/16 | (2011.01) |
| G06F 21/62 | (2013.01) |

(52) U.S. Cl.
CPC ............ *G06F 21/6218* (2013.01); *G06F 17/30* (2013.01); *G06F 17/30876* (2013.01); *H04L 63/10* (2013.01); *H04L 63/20* (2013.01)

(58) Field of Classification Search
CPC .............................. G06F 21/6218; G06F 17/30
USPC ............... 713/165, 166, 167; 726/1–7, 26–29
See application file for complete search history.

(56) References Cited

U.S. PATENT DOCUMENTS

| | | | |
|---|---|---|---|
| 7,206,806 B2 * | 4/2007 | Pineau .......................... | 709/203 |
| 8,615,487 B2 * | 12/2013 | Gomez et al. ................. | 707/612 |
| 8,769,270 B2 * | 7/2014 | Orsini et al. .................. | 713/165 |

(Continued)

*Primary Examiner* — Thanhnga B Truong
*Assistant Examiner* — Khalil Naghdali
(74) *Attorney, Agent, or Firm* — Hickman Palermo Becker Bingham LLLP

(57) ABSTRACT

A content management system implementing methodologies providing retroactive shared content item links is disclosed. The content management system and methodologies allow a team administrator of a team to configure a team-wide shared link policy that determines whether non-team members can access content items associated with team accounts using shared links generated for the content items by team members. The team shared link policy has two settings. In a first setting, the content management system allows non-team members to use shared links generated by team members to access content items associated with team accounts. In a second setting, the content management system blocks access to the content items by non-team members. Shared links are retroactive in the sense they do not need to be regenerated after the team shared link policy has been changed from the second setting back to the first setting.

21 Claims, 4 Drawing Sheets

(56) References Cited

U.S. PATENT DOCUMENTS

| | | |
|---|---|---|
| 2002/0087678 A1 | 7/2002 | Padilla |
| 2003/0120729 A1* | 6/2003 | Kim et al. .................... 709/203 |
| 2008/0216139 A1* | 9/2008 | Liwerant et al. ............. 725/113 |
| 2010/0185698 A1* | 7/2010 | Lee et al. ...................... 707/803 |
| 2010/0287368 A1* | 11/2010 | Shuster et al. ................ 713/150 |
| 2011/0264532 A1* | 10/2011 | Chan et al. .................. 705/14.66 |
| 2012/0331108 A1 | 12/2012 | Ferdowsi et al. |
| 2013/0067303 A1 | 3/2013 | Kantor et al. |

\* cited by examiner

RETROACTIVE SHARED CONTENT ITEM LINKS

PRIORITY CLAIM

This application claims the benefit of Provisional Appln. 61/762,894, filed Feb. 9, 2013, the entire contents of which is hereby incorporated by reference as if fully set forth herein, under 35 U.S.C. §119(e).

BACKGROUND

The present invention relates to content management systems, and more particularly to systems and methods for retroactive shared content item links.

Conventionally, there are many different ways users can share digital content items ("content items") with each other. One way to share a content item with a user is to send the content item as an attachment to an electronic mail (e-mail) message. Another way is to provide the content item on a portable data storage medium such as flash drive that is physically delivered to the user. Digital content items include files, folders, documents, images, audio, video, streaming media, or other logical collections of data or digital information.

Conventional methods for sharing content items are cumbersome and inefficient. For example, an attachment to an e-mail message may not be received because of attachment size limits or mailbox size limits enforced by an e-mail server. As another example, if the flash drive on which the only copy of a content item is stored is lost or destroyed, then the content item is potentially lost forever.

One possible approach for sharing a content item is for the sharing user to upload the content item to a server from which another user can download the content item. However, once the content item has been uploaded to the server, it may be difficult for the sharing user to retain control over who else can download the content item from the server. For example, one user that the sharing user intended to download the content item from the server may share the location on the server of the content item with another user the sharing user did not intend to download the content item from the server.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF AN EMBODIMENT

A content management system performing a method providing retroactive shared content item links is disclosed. In one embodiment, for example, the method includes the content management system receiving a request to access a content item associated with a shared link from a client device of a user. The request may specify the shared link. For example, the request may by a HyperText Transfer Protocol (HTTP) or Secure HyperText Transfer Protocol (HTTPS) request that specifies the shared link as the request Uniform Resource Locator (URL). In response to receiving the request, the content management system determines a team associated with the content item. The team may a named group of user accounts held with the content management system and that belong to the team. The user making the request may not belong to the team (i.e., is a non-team member with respect to the team). The method further includes the content management system determining a current setting of a team shared link policy of the team, which may have been previously configured by a team administrator of the team. The current setting of the team reflects one of the following polices of the team with respect to use of shared links to access content items associated with the team. In particular, the current setting reflects: (a) that users that are not members of the team are not permitted to use shared links to access content items associated with the team, or (b) users that are not members of the team are not prohibited by the team shared link policy of the team from using shared links to access content items associated with the team. If the current setting of the team shared link policy of the team reflects (a) that users that are not members of the team are not permitted to use shared links to access content items associated with the team, then the method includes the content management system returning a response to the client device of the user that indicates that the user is permitted to access the content item. If, on the other hand, the current setting of the team shared link policy of the team reflects (b) that users that are not members of the team are not prohibited by the team shared link policy of the team from using shared links to access content items associated with the team, then the method includes the content management system returning a response to the client device of the user that comprises at least a portion of the content item.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Glossary

Figure 1:
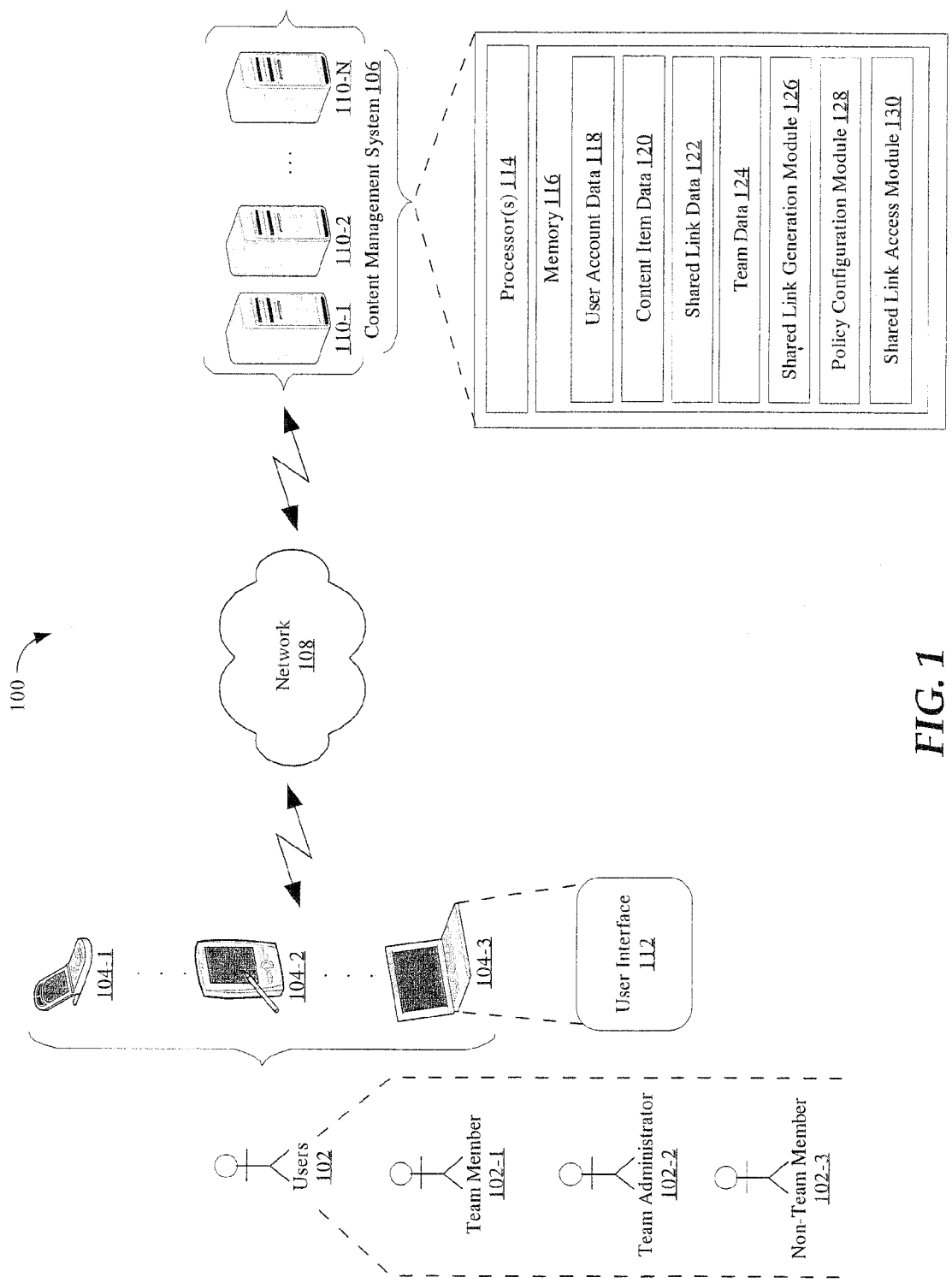
FIG. 1 is a block diagram illustrating an exemplary computing environment containing a content management system usable for providing retroactive shared content item links.

URL—URL is an abbreviation of Uniform Resource Locator, a character string with a specific syntax for addressing and accessing a resource on a network. The first part of the character string indicates what network protocol to use to access the resource (e.g., "http" or https"), followed by a colon and two forward slashes. The second part of the string specifies an IP address or a domain name where the resource is located on the network. The optional third part of the string indicates a location-specific path to the resource. The third part may also contain application-specific data (e.g., a query string) and subordinate resource identifying information (e.g., a fragment identifier).

Overview

A content management system implementing methodologies providing retroactive shared content item links is disclosed. According to some embodiments of the present invention, the content management system and associated methodologies allow a team administrator of a team to configure a team-wide shared link policy that determines whether users outside the team ("non-team members") can access content items associated with team accounts using shared links generated for the content items by team members. Specifically, the team shared link policy has at least two settings. In a first setting, the content management system allows non-team members to use shared links generated by team members to access content items associated with team accounts. In a second setting, the content management system blocks access to the content items by non-team members.

Significantly, shared links are retroactive with respect to the team shared link policy. In particular, shared links used by non-team members to access content items associated with team accounts while the policy is in the first setting can no longer be used to access the content items after the team link sharing policy has been changed to the second setting. However, if the team administrator configures the policy back to the first setting, then non-team members can once again access the content items using the shared links. By appropriately configuring the team link sharing policy, a team administrator can temporarily block shared link access to content items associated with team accounts by non-team members. By allowing team members to share team content items as retroactive shared content item links, the content management system provides improved security with greater administrative convenience.

Digital Content Item

In this description, a "digital content item", or just "content item", may be considered as any logical collection of digital content. The digital content of a content item can be uniform or mixed and can take a variety of different forms. For example, the digital content can include a combination of one or more of text, animation, audio, video, graphics, images, streaming media, other data, or other digital information. For example, a content item can be, but is not required to be, a file or folder. Exemplary types of files include digital documents (e.g., .DOC, .PDF, .XLS, and .TXT documents), digital audio files (e.g., .WAV, .M4A, .MP3, and .AAC files), digital video files (e.g., .AVI, .MOV, and .MP4 files), digital image files (e.g., .JPEG, .TIFF, GIF, and PNG files), compressed file archives (e.g., .ZIP files), etc. A folder can be considered a named collection of one or more files and/or one or more folders. A folder contained in the collection of another folder can be considered to be a sub-folder of the other folder. A sub-folder can have further sub-folders thereby forming a file-folder hierarchy having an arbitrary number of hierarchical levels. The file-folder hierarchy can have a single top-level folder referred to as the root folder. While content items can be arranged in a file-folder hierarchy, it should be understood that such arrangement is not required of the content items. Instead, content items can be arranged in any manger suitable for the particular implementation at hand.

Shared Link

The term "shared link" as used herein refers to a network address of a content item available from the content management system, which is also on the network. A shared link can take a variety of different forms. In examples presented below, shared links take the form of a Uniform Resource Locator (URL). However, other forms for shared links are possible and the present invention is not limited to URLs or any particular network address form.

Team

To provide improved security with greater administrative convenience, the content management system allows users to generate retroactive shared content item links ("retroactive shared links") in the context of a "team". A "team" is a named collection of user accounts that the users have with content management system. For example, a team may correspond to a business or organization or a department or division within a business or organization. The content management system may support multiple different teams at the same time. A user account that belongs to a team is referred to hereinafter as a "team account" with respect to the team. A user of a team account is referred to herein as a "team member" of the team that the team account belongs to. At least one of the team accounts of a team may be an administrative account of the team. A user of an administrative account is referred to hereinafter as a "team administrator" of the team that the administrative account belongs to.

A user may have multiple accounts with the content management system including multiple individual accounts, multiple team accounts, or a mix of individual and team accounts. For purposes of the following discussion, a user is considered to interact with the content management system in one of two ways: (1) in the context of a particular user account, which is either an individual account or a team account, or (2) anonymously. If in the context of a particular user account, an identity of the user is known to the content management system by which the content management system can authorize the user to interact with the content management system in the context of the particular account. Such an identity can be established, for example, by successfully validating a username and password combination or other authentication credentials associated with the particular account provided by the user. If anonymously, then a sufficient identity by which the content management system can authorize the user to interact with the content management system in the context of a particular account is not known to the content management system.

Exemplary Computing Environment

FIG. 1 is a block diagram illustrating an example computing environment 100 for retroactive shared content item links. Users 102, each associated with one or more client computing devices ("client devices") 104, interact with content management system 106 via network 108. Users 102 include team member 102-1, team administrator 102-2, and non-team member 102-3. For purposes of providing clear examples, team member 102-1 and team administrator 102-2 are considered to belong to a particular team which non-team member 102-3 does not belong to. For purposes of providing clear examples, a single team member, a single team administrator, and a single non-team member are depicted in example computing environment 100 of FIG. 1. However, it should be understood that a team can have multiple team members and multiple team administrators. Further, it should be understood that there may be multiple non-team members with respect to the particular team. Moreover, there may be multiple teams supported by content management system 106 including other teams which team member 102-1, team administrator 102-2, and non-team member 102-3 all belong to. Thus, while examples of using retroactive shared links are provided in the context of a particular team supported by content management system 106, it should be understood that content management system 106 may support multiple teams in which users 102 can belong to multiple teams and different users 102 can belong to different teams.

Client devices 104 may be implemented in any number of ways. In FIG. 1, the devices are illustrated as a wireless telephone 104-1, a portable digital assistant (PDA) 104-2, and a laptop computer 104-3. But, other example implementations include a desktop computer, a workstation computer, a tablet computer, a television set-top box, a game console, a portable gaming device, a digital video recorder, electronic book readers, netbooks, and other electronic or entertainment devices.

Network 108 is representative of many different types of networks, such as cable networks, the Internet, local area networks, mobile telephone networks, wide area networks and wireless networks, or a combination of such networks.

Content management system 106 may comprise one or more servers 110-1 through 110-N, perhaps arranged as a server farm in a data center. Other server architectures may also be used to implement content management system 106 and the present invention is not limited to any particular server architecture.

Users 102 use client devices 104 to interact with content management system 106 via network 108. User interface 112 may be used to interact with content management system 106. User interface 112 may be implemented using software instructions executed by client devices 104. For example, client devices 104 may download the software instructions implementing user interface 112 from content management system 106. In some embodiments, the software instructions implementing user interface 112 are web browser instructions such as, for example, HyperText Markup Language (HTML), Cascading Style Sheet (CSS) instructions, and JavaScript instructions. In these embodiments, a web browser installed on client devices 104 executes the web browser instructions to provide user interface 112 as a collection of web pages. In other embodiments, the software instructions implementing user interface 112 are installed on client devices 104 as part of a dedicated client application (e.g., a mobile or web application).

In either case, whether user interface 112 is web browser-based or driven by a dedicated client application, users 102 use user interface 112 to command client devices 104 to make requests of content management system 106 via network 108. In particular, team member 102-1 can use user interface 112 to command associated client devices 104 to request content management system 106 to generate a shared link for a selected content item associated with the team member 102-1's team account, team administrator 102-2 can use user interface 112 to command associated client devices 104 to request content management system 106 to configure the team shared link policy for the particular team that team member 102-1 and team administrator 102-2 belong to, and non-team member 102-3 can use user interface 112 to command associated client devices 104 to request content management system 106 to access the content item at the shared link generated by the team member 102-1.

In response to requests from client devices 104 via network 108, content management system 106 may return responses to the requests to client devices 104 also via network 108. Such requests and responses can be packaged for transport via network 108 according to a variety of different networking protocols including, as examples, the HyperText Transfer Protocol (HTTP) or the Secure-HyperText Transfer Protocol (HTTPS). Data contained in responses returned to client devices 104 may be used to update user interface 112, for example, to display results of the corresponding request.

Servers 110-1 through 110-N may be equipped with one or more processors ("CPUs") 114 and memory 116. Memory 116 represents any combination of volatile and non-volatile computer memory. Memory 116 may store applications, modules, and data. In particular memory 116 may store user account data 118, content item data 120, shared link data 122, team data 124, shared link generation module (or sets of instructions) 126, team shared link policy configuration module (or sets of instructions) 128, and shared link access module (or sets of instructions) 130.

User Account Data

User account data 118 represent user accounts held by users 102 of content management system 106. Not all users 102 may have a user account with content management system 106. For example, non-team member 102-3 may not have a user account and interact with content management system 106 as an anonymous user. Team member 102-1 and team administrator 102-2, however, do have user accounts with content management system 106. User account data 118 for a user account may include an account identifier. The account identifier may be an e-mail address or other alpha-numeric sequence. User account data 118 for a user account may also include credential information for user authentication purposes. In some embodiments, users 102 are authenticated by a third-party authentication service (not illustrated) in which case user account data 118 for a user account may not include credential information. User account data 118 for a user account may include user notification/messaging information such as an e-mail address to which e-mail messages may be sent and/or a phone number to which text messages may be sent. User account data 118 for a user account may also include account type information. The account type information may specify whether the user account is a team account or an individual account. If a team account, the account type information may specify the team the user account belongs to. In addition or alternatively, information specifying which user accounts belong to which teams may be stored as part of team data 124.

Content Item Data

Content item data 120 represents the content items managed by content management system 106. Such management may include storing the content items on servers 110. Alternatively, some or all of the content items may be stored on third-party servers (not illustrated) in which case content item data 120 for the third-party server-stored content items represents pointers or references to the content items stored on the third-party servers. Such pointers or references may take the form of a URL, as an example. Each content item managed by content management system 106 may be associated with a user account. If a content item is associated with a team account, then the content item is considered to be associated with the team that the team account belongs to. Content item data 120 may contain metadata indicating the user accounts or teams that content items are associated with. In addition or alternatively, user account data 118 and/or team data 124 may contain such metadata.

Shared Link Data

Shared link data 122 represents shared links generated for content items. Shared link data 122 for a generated shared link may indicate the content item for which the shared link was generated. For example, shared link data 122 for the shared link may specify an identifier of the content item. The identifier may be an internal identifier used by content management system 106 to uniquely identify the content item among content item data 120. Shared link data 122 for the shared link may also specify user-facing components of the shared link. Such user-facing components may be used by content management system 160 to identify shared link data 122 for the shared link when the shared link is submitted to content management system 106 in a request from client computing device 104 of non-team member 102-3 to access the underlying content item. In some embodiments, the user-facing components include a unique alpha-numeric sequence and a name of the underlying content item. For example, the following example shared link in the form of a URL includes the unique alpha-numeric sequence '1e880joqfrlwnkf' and the content item name 'Getting%20Started.pdf':

https://[content management service name]/s/1e880joqfrlwnkf/Getting%20Started.pdf In the above-example shared link URL, the character sequence %20 is used to encode the space character between 'Getting' and 'Started' in the shared link URL. The '[content management service name]' may be a hostname or network address associated with content management system 106.

Team Data

Team data 124 represents teams managed by content management system 106. Team data 124 for a team may include a current team shared link policy setting. As mentioned above, the setting can assume at least two different states as configured by a team administrator of the team. In one setting referred to hereinafter as the "non-team member access allowed setting", content management system 106 allows non-team members with respect to the team to use shared links generated by team members to access content items associated with team accounts. In a second setting referred to hereinafter as the "non-team member access prohibited setting", content management system 106 does not permit non-team members with respect to the team to use shared links generated by team members to access content items associated with team accounts. Team data 124 for a team may also include other information such as a team name, the user accounts that belong to the team, which of the user accounts that belong to the team are team administrator accounts, among other team-related information.

Shared Link Generation Module

Shared link generation module 126 represents computer-implemented logic for generating a shared link for a content item associated with a team account at the request of a team member. For example, team member 102-1 may use user interface 112 to command client device 104 associated with team member 102-1 to request shared link generation module 126 to generate a shared link for a selected content item associated with team member 102-1's team account. Team member 102-1 may select the content item via user interface 112. In response to the request, shared link generation module 126 generates the shared link and may then send the generated shared link to the requesting client device 104 whereupon the generated shared link may be displayed to team member 102-2 in user interface 112 and/or copied to an operating system clipboard of requesting client device 104. The team member 102-1 may share the shared link with other users 102 in an e-mail message or otherwise provide the shared link to other users 102. For example, team member 102-1 may post the shared link on a web page or send the shared link to other users 102 in a text message.

In some embodiments, in addition to commanding client device 104 to request shared link generation module 126 to generate a shared link for a selected content item, user interface 112 can be used by team member 102-1 to specify one or more shared link recipients to shared link generation module 126 for a generated shared link. For example, the shared link recipients may be specified by the team member 102-1 by their e-mail addresses or user account identifiers. After generating the shared link, shared link generation module 126 may send the generated shared link to the specified shared link recipients by any appropriate electronic means. For example, shared link generation module 126 may send the generated shared link to the specified link recipients in an e-mail and/or text message.

In response to a request to generate a shared link, share link generation module 126 is also responsible for storing shared link data 122 for the generated shared link. As mentioned above, such data may include user-facing components of the generated shared link and an identifier of the underlying content item that the generated shared link was generated for as well as any other information needed by content management system 106.

Policy Configuration Module

Team shared link policy configuration module 128 represents computer-implemented logic for configuring the team shared link policies of teams. For example, team administrator 102-2 can use user interface 112 to command client device 104 associated with team administrator 102-2 to request policy configuration module 128 to set the team shared link policy for the team that team administrator 102-2 is a team administrator of to either the non-team member access allowed setting or the non-team member access prohibited setting. In response to receiving such a request, policy configuration module 128 may modify team data 124 for the team to reflect the team shared link policy setting selected by team administrator 102-2.

Shared Link Access Module

Shared link access module 130 represents computer-implemented logic for accessing an underlying content item associated with a submitted shared link. For example, non-team member 102-3 can use user interface 112 to command client device 104 associated with non-team member 102-3 to request shared link access module 130 to provide access to a content item at a shared link. The shared link may be submitted in the request. For example, the request may be a HTTP or HTTPS request in which the shared link is the request URL. In response to receiving the request, shared link access module 130 may read shared link data 122 to determine the underlying content item to which access is requested. If the underlying content item is associated with a team account, then shared link access module 130 may read team data 124 for the team to which the team account belongs to determine the current team shard link policy setting. If the current team shared link policy setting for the team is "non-team member access allowed", then shared link access module 130 determines that the team shared link policy setting does not prohibit non-team member 102-3 from accessing the underlying content item. Note, however, the content item may be associated with other access controls that prohibit non-team member 102-3 from accessing the underlying content item. These other possible access controls are beyond the scope of the present invention but may include other conventional access controls such as access controls based on users, groups, roles, permissions, etc. If, on the other hand, the current team shared link policy setting for the team is "non-team member access prohibited", then shared link access module 130 determines that the team shared link policy setting prohibits non-team member 102-3 from accessing the underlying content item. In some embodiments, a current setting of "non-team member access prohibited" for the team shared link policy overrides any other access controls associated with the underlying content item or the shared link which otherwise would allow non-team member 102-3 to access the underlying content item. By doing so, team administrator 102-2 can block all non-team member access to team content items by configuring the team shared link policy to "non-team member access prohibited".

In some embodiments, if non-team member 102-3 is allowed to access the underlying content item according to the team shared link policy and any other associated access controls, then shared link access module 130 provides the underlying content item or a portion thereof to requesting client device 104 of non-team member 102-3. For example, a preview of the underlying content item may be displayed in user interface 112 or the underlying content item may be downloaded to requesting client device 104 of non-team member 102-3. If, on the other hand, non-team member 102-3 is not allowed to access the underlying content item according to the team shared link policy, then shared link access module 130 may return an appropriate message for display to non-team member 102-3 in user interface 112. Such message may state "access denied", "temporarily unavailable", "404 not found", or other similar message.

Exemplary Process for Using Retroactive Shared Links

Figure 2:
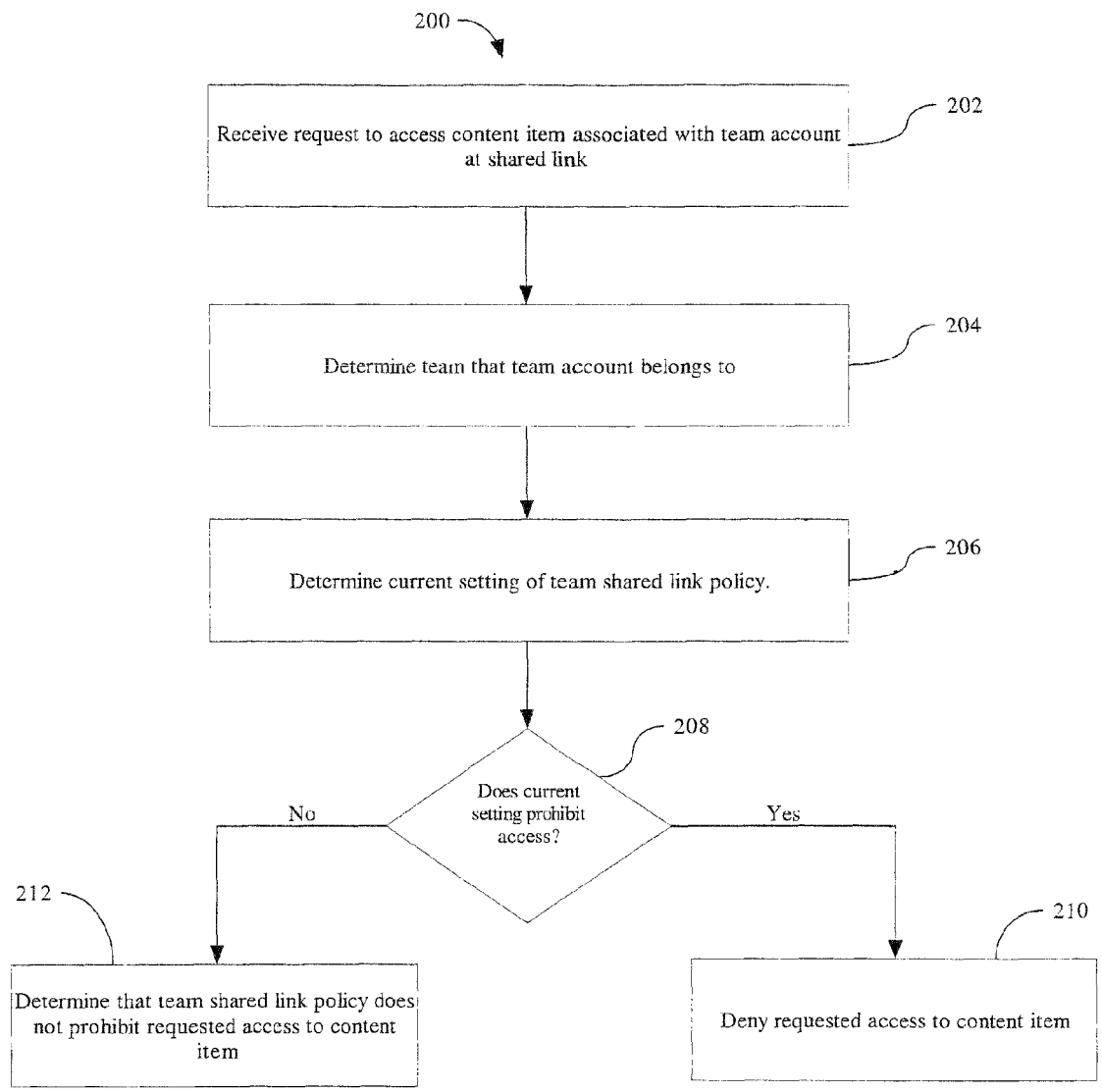
FIG. 2 is a flow diagram illustrating an exemplary process for using retroactive shared content item links.

FIG. 2 is a flowchart 200 illustrating an example process for using a retroactive shared link to access a content item at the shared link. The process may be performed by one or more computing devices. For example, the process may be performed by one or more servers 110 of exemplary computing environment 100.

At step 202, a request is received to access a content item associated with a team account at a shared link. For example, the request may be received by shared link access module 130 of content management system 106. The request may include the shared link. For example, the request may be a HTTP or HTTPS request that specifies the shared link as the request URL. The request may be sent from a client device of a non-team member. For example, the request may be sent from client device 104 associated with non-team member 102-3. The non-team member may have previously obtained the shared link from a team member. For example, non-team member 102-3 may have previously obtained the shared link from team member 102-1 in an e-mail message sent by team member 102-1 or by content management system 106 at the command of team member 102-1. Alternatively, non-team member 102-3 may have obtained the shared link from a web page or even surreptitiously or without the knowledge of team member 102-1.

At step 204, the team that the requested content item is associated with is determined. For example, such determination can be made by determining the content item referred to by the shared link, then determining the team account the content item is associated with, and then determining the team that the team account belongs to.

At step 206, the current setting of the team shared link policy of the team determined in step 204 is determined. For example, this determination may involve shared link access module 130 reading the current setting from a database such as team data 122 stored in memory 116 of content management system 106.

At step 208, it is determined whether the current setting of the team shared link policy prohibits the requested access to the content item. Such determination may be based on the policy that the current setting represents. In some embodiments, the current setting represents one of at least two different access policies with respect to non-team members. In particular, the current setting can represent an access policy in which non-team members are not permitted to access content items associated with team accounts using shared links even if other access controls otherwise allow non-team members to access the content item. The current setting can alternatively represent an access policy in which non-team members are permitted to access the content items using shared links assuming no other access controls prohibit the non-team members from doing so. If the current setting does prohibit the requested access, then the requested access is denied at step 210. If, on the other hand, the current setting of the team shared link policy does not prohibit the requested access, then it is determined at step 212 that the current setting should not prohibit the requested access to the content item. However, other access controls may still block the requested access.

Figure 3:
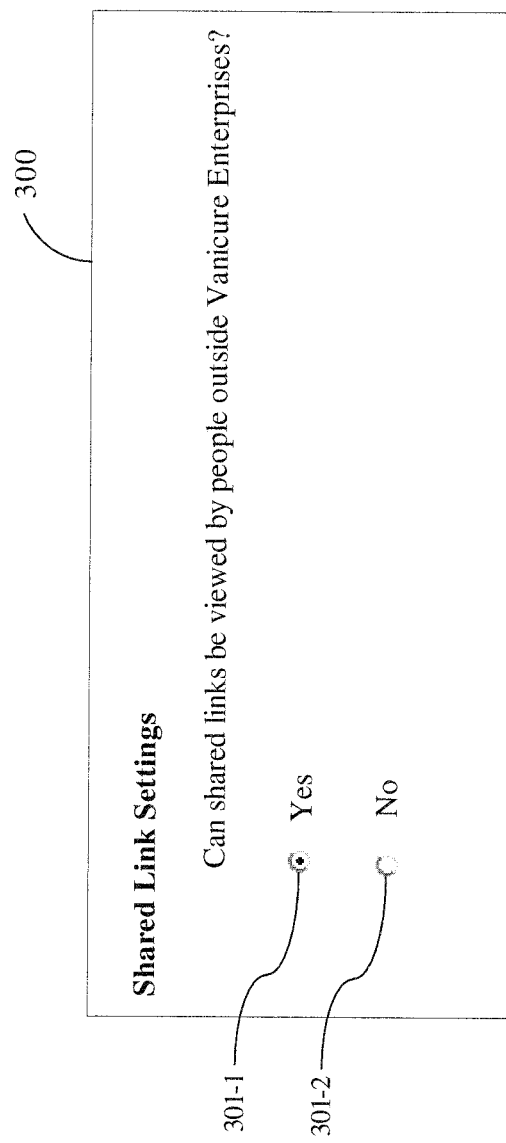
FIG. 3 illustrating an example graphical user interface for configuring a team shared link policy.

Advantageously, a team administrator of a team may configure the team shared link policy for the team to temporarily block all shared link access to content items associated with team accounts by non-team members. Such configuration may be facilitated by an easy to use user interface that presents selectable configuration options for the team shared link policy to the team administrator. FIG. 3 illustrating an example user interface 300 for configuring the team shared link policy for a team. Such interface 300 may be presented to a team administrator of the team which, in this example, is named "Vanicure Enterprises". Example user interface 300 includes two selectable radios buttons 301-1 and 301-2. Selection of the first radio button 301-1 represents the team shared link policy that non-team members with respect to the "Vanicure Enterprises" team are not prohibited by the policy from accessing content items associated with team accounts that belong to the "Vanicure Enterprises" team using shared links generated for the content items. Selection of the second radio button 301-1 represents the team shared link policy that non-team members with respect to the "Vanicure Enterprises" team are prohibited from accessing "Vanicure Enterprises" content items using generated shared links.

The retroactive feature of generated shared links with respect to the team shared link policy allows a team administrator to toggle back and forth over time between blocking access to team content items using shared links generated for the content items and not blocking access to the team content items using the generated shared links without having to re-generate the shared links. For example, a shared link for a team content item can be generated by a team member at a first time when the team shared link policy does not block access to the content item by non-team members. At a later second time, the team administrator can configure to the team shared link policy to block access. While the team shared link policy is configured to block access, non-team members will not be permitted to access the content item using the shared link generated at the first time. If at a third time that is later than the second time, the team administrator configures the team shared link policy to not block access, then non-team members can once again access the content item using the shared link generated at the first time. Re-generation of a shared link for the content item is not necessary to restore access to the content item to the non-team members.

Computer-Based Implementation

The computer-implemented techniques of the present invention may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer system, server computer systems, portable computer systems, handheld electronic devices, networking devices or any other computing device that incorporates hard-wired and/or program logic to implement the techniques.

Figure 4:
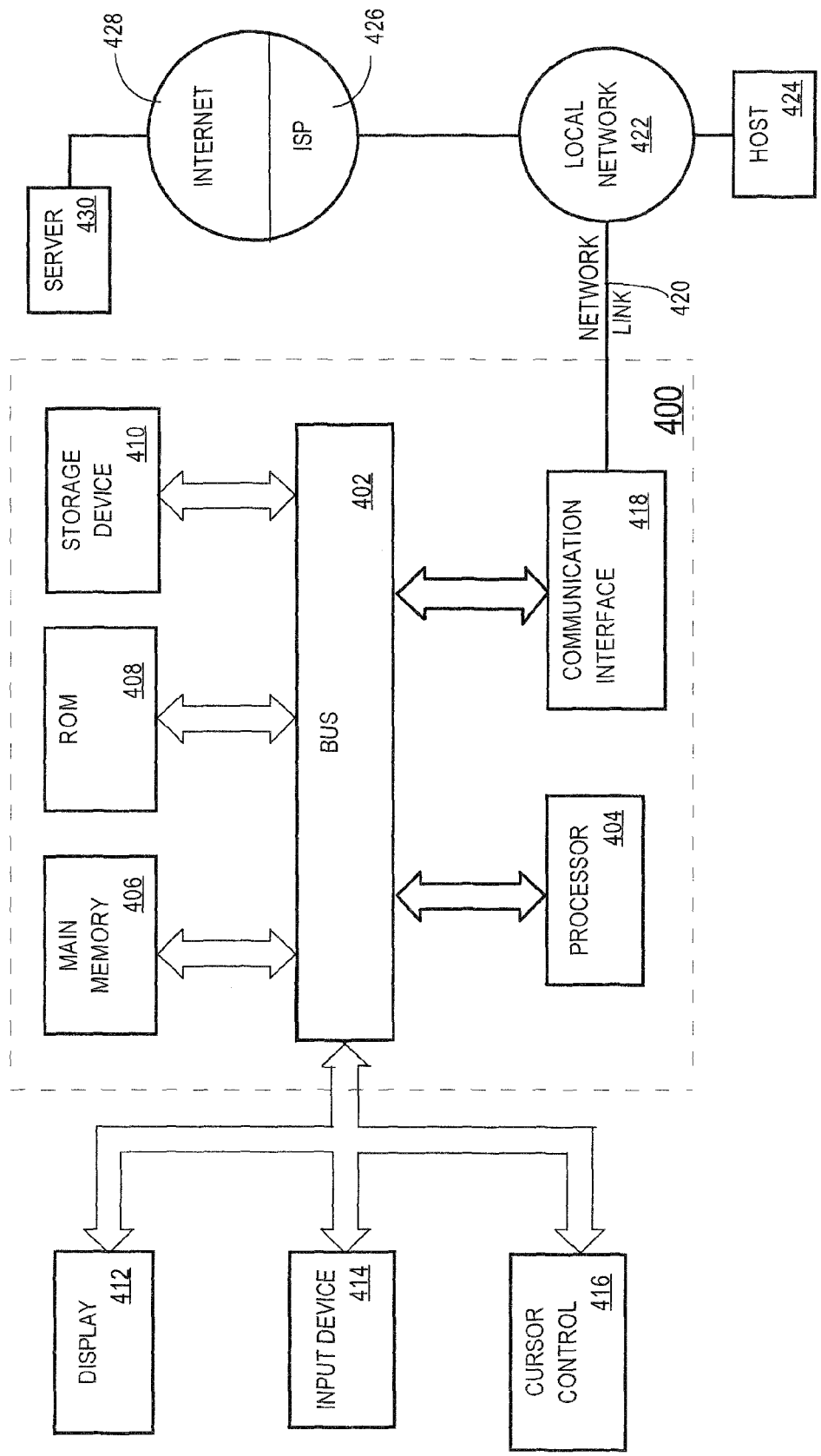
FIG. 4 is a block diagram of a computer system upon which embodiments of the invention may be implemented.

For example, FIG. 4 is a block diagram that illustrates a computer system 400 upon which an embodiment of the invention can be implemented. Computer system 400 includes a bus 402 or other communication mechanism for communicating information, and a hardware processor 404 coupled with bus 402 for processing information. Hardware processor 404 can be, for example, a general purpose microprocessor. Although only one hardware processor 404 is shown in FIG. 4, computer system 400 can have more than one hardware processor 404 coupled to bus 402 for processing information.

Computer system 400 also includes a main memory 406, such as a random access memory (RAM) or other dynamic storage device, coupled to bus 402 for storing information and instructions to be executed by processor 404. Main memory 406 also can be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 can be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

A touch-sensitive surface can overlay display 412 as an input device 414 to form a touch-sensitive display that provides an input interface and an output interface between the system 400 and a user. The touch-sensitive surface can be a sensor or set of sensors that accepts input from the user based on haptic and/or tactile contact. Contact with the touch-sensitive surface can be made by the user with a stylus or set of styluses or a finger or a set of fingers. The touch-sensitive surface can detect contact and any movement or breaking thereof using any of a plurality of touch sensing techniques now known or later developed including, but not limited to, capacitive, resistive, infrared, and acoustic wave techniques, as well as other proximity sensor arrays or other elements for detecting one or more points of contact, movement of contact, and breaking of contact with the touch-sensitive surface.

Although display 412, input device 414, and cursor control 416 are illustrated outside the dashed box representing computer system 400 in FIG. 4, it should be understood that one or more of display 412, input device 414, and cursor control 416 can be part of the form factor of the computer system 400. For that matter, although main memory 406, ROM 408, storage device 410, bus 402, processor 404, and communication interface 418 are illustrated inside the dashed box representing computer system 400, it should be understood that one or more of these components can be external to the form factor of the computer system 400 and operatively coupled to the form factor through a peripheral interface.

Computer system 400 can implement the techniques described herein using customized hard-wired logic, one or more ASICs or FPGAs, firmware and/or program logic which, in combination with the computer system, causes or programs computer system 400 to be a special-purpose machine. According to one embodiment, the techniques herein are performed by computer system 400 in response to processor 404 executing one or more sequences of one or more instructions contained in main memory 406. Such instructions can be read into main memory 406 from another storage medium, such as storage device 410. Execution of the sequences of instructions contained in main memory 406 causes processor 404 to perform the process steps described herein. In alternative embodiments, hard-wired circuitry can be used in place of or in combination with software instructions.

The term "storage media" as used herein refers to any non-transitory media that store data and/or instructions that cause a machine to operation in a specific fashion. Such storage media can comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but can be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 can optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 can be an integrated services digital network (ISDN) card, cable modem, satellite modem, or a modem to provide a data communication connection to a corresponding type of telephone line. As another example, communication interface 418 can be a local area network (LAN) card to provide a data communication connection to a compatible LAN. Wireless links can also be implemented. In any such implementation, communication interface 418 sends and receives electrical, electromagnetic or optical signals that carry digital data streams representing various types of information.

Network link 420 typically provides data communication through one or more networks to other data devices. For example, network link 420 can provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code can be executed by processor 404 as it is received, and/or stored in storage device 410, or other non-volatile storage for later execution.

The above-described computer hardware is presented for purposes of illustrating the basic underlying computer components that can be employed for implementing the present invention. For purposes of discussion, the following description will present example in which it will be assume that there exists a "server" (e.g., a web server, capable of hosting methods of the present invention as web services) that communicates with one or more "clients" (e.g., desktop or portable computers, from which users log on to the server in order to use the web services). The present invention, however, is not limited to any particular environment or device configuration. In particular, a client/server distinction is not necessary to the invention, but is simply a suggested framework for implementing the present invention. Instead, the present invention can be implemented in any type of system architecture or processing environment capable of supporting the methodologies of the present invention presented in detail below, including implementing the methodologies on a standalone computer.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
at one or more servers of a content management system comprising one or more processors and computer memory:
receiving, from a client device of a user, a request to access a content item associated with a shared link;
wherein the request specifies the shared link;
in response to receiving the request:
determining a team, comprising one or more members, that is associated with the content item;
wherein the user is not a member of the team;
determining a current setting of a team shared link policy of the team;
wherein the current setting reflects one of the following polices of the team with respect to use of shared links to access content items associated with the team:
(a) users that are not members of the team are not permitted to use shared links to access content items associated with the team; or
(b) users that are not members of the team are not prohibited by the team shared link policy of the team from using shared links to access content items associated with the team;
if the current setting reflects (a) that users that are not members of the team are not permitted to use shared links to access content items associated with the team, then returning a response to the client device of the user that indicates that the user is not permitted to access the content item; or
if the current setting reflects (b) that users that are not members of the team are not prohibited by the team shared link policy of the team from using shared links to access content items associated with the team, then returning a response to the client device of the user that comprises at least a portion of the content item.

2. The method of claim 1, wherein the shared link is a Uniform Resource Locator (URL).

3. The method of claim 1, wherein the shared link comprises an alphanumeric sequence and a name of the content item.

4. The method of claim 1, wherein the request is formatted as a HyperText Transfer Protocol (HTTP) or a Secure HyperText Transfer Protocol (HTTPS) request.

5. The method of claim 1, wherein determining the team associated with the content item includes determining a team account associated with the content item and determining a team that the team account belongs to.

6. The method of claim 1, wherein the team comprises a plurality of team accounts.

7. The method of claim 1, further comprising:
prior to receiving the request to access the content item associated with the shared link, generating the shared link.

8. The method of claim 1, wherein the user is an anonymous user that does not have a user account with the content management system.

9. The method of claim 1, wherein determining the current setting of the team shared link policy of the team comprising reading the current setting from the computer memory of the content management system.

10. The method of claim 1, wherein if the current setting reflects (b) that users that are not members of the team are not prohibited by the team shared link policy of the team from using shared links to access content items associated with the team, then returning the response to the client device of the user that comprises at least a portion of the content item only after determining that no other access controls prohibit the user from accessing the content item.

11. The method of claim 1,
wherein the request is a first request;
wherein the first request is received at a first time;
wherein, at the first time, the current setting reflects (b) that users that are not members of the team are not prohibited by the team shared link policy of the team from using shared links to access content items associated with the team;
wherein the method further comprises:
returning a response to the client device of the user that comprises at least a portion of the content item, in response to receiving the first request;

receiving, at a second time that is after the first time, from a client device of the user, a second request to access the content item associated with the shared link;

wherein, at the second time, the current setting reflects (a) that users that are not members of the team are not permitted to use shared links to access content items associated with the team;

returning a response to a client device of the user that indicates that the user is not permitted to access the content item, in response to receiving the second request;

receiving, at a third time that is after the second time, from a client device of the user, a third request to access the content item associated with the shared link;

wherein, at the third time, the current setting reflects (b) that users that are not members of the team are not prohibited by the team shared link policy of the team from using shared links to access content items associated with the team;

returning a response to a client device of the user that comprises at least a portion of the content item, in response to receiving the third request.

12. A system comprising:

one or more server computing devices configured to:

receive, from a client device of a user, a request to access a content item associated with a shared link;

wherein the request specifies the shared link;

wherein the one or more server computing devices are further configured to, in response to receiving the request, determine a team, comprising one or more members, that is associated with the content item;

wherein the user is not a member of the team;

determine a current setting of a team shared link policy of the team;

wherein the current setting reflects one of the following polices of the team with respect to use of shared links to access content items associated with the team:

(a) users that are not members of the team are not permitted to use shared links to access content items associated with the team; or (b) users that are not members of the team are not prohibited by the team shared link policy of the team from using shared links to access content items associated with the team;

if the current setting reflects (a) that users that are not members of the team are not permitted to use shared links to access content items associated with the team, then return a response to the client device of the user that indicates that the user is not permitted to access the content item; or if the current setting reflects (b) that users that are not members of the team are not prohibited by the team shared link policy of the team from using shared links to access content items associated with the team, then return a response to the client device of the user that comprises at least a portion of the content item.

13. The system of claim 12, wherein the shared link is a Uniform Resource Locator (URL).

14. The system of claim 12, wherein the shared link comprises an alphanumeric sequence and a name of the content item.

15. The system of claim 12, wherein the request is formatted as a HyperText Transfer Protocol (HTTP) or a Secure HyperText Transfer Protocol (HTTPS) request.

16. The system of claim 12, wherein the one or more server computing devices are further configured to, in response to receiving the request, determine a team account associated with the content item; and determine a team that the team account belongs to.

17. The system of claim 12, wherein the team comprises a plurality of team accounts.

18. The system of claim 12, wherein the one or more server computing devices are further configured to generate the shared link.

19. The system of claim 12, wherein the user is an anonymous user that does not have a user account with the content management system.

20. The system of claim 12, wherein the one or more server computing devices are further configured to, in response to receiving the request, read the current setting from the computer memory of the content management system.

21. The system of claim 12, wherein the one or more server computing devices are further configured to, in response to receiving the request, if the current setting reflects (b) that users that are not members of the team are not prohibited by the team shared link policy of the team from using shared links to access content items associated with the team, then return the response to the client device of the user that comprises at least a portion of the content item only after determining that no other access controls prohibit the user from accessing the content item.

* * * * *